United States Patent

Fine

[15] 3,702,593
[45] Nov. 14, 1972

[54] REMOVAL OF SURFACE FROM BORON CARBIDE COMPOSITE ARMOR

[72] Inventor: Richard A. Fine, Rochester, Minn.
[73] Assignee: Norton Company, Worcester, Mass.
[22] Filed: Oct. 21, 1968
[21] Appl. No.: 772,062

[52] U.S. Cl.....................109/80, 89/36 A, 161/404
[51] Int. Cl.................................................F41h 5/04
[58] Field of Search............23/208 A; 51/283; 89/36; 109/80, 82, 84; 161/404, 193, 194

[56] References Cited

UNITED STATES PATENTS

| 2,697,054 | 12/1954 | Dietz et al.............89/36 A |
| 3,009,845 | 11/1961 | Wiser.................161/404 UX |
| 3,177,628 | 4/1965 | Highberg....................51/283 |
| 3,573,150 | 3/1971 | Broutman et al.........89/36 A |

OTHER PUBLICATIONS

Ceramic Industry, New G–E Ceramic Transmitts Light, pages 57 and 119, Oct. 1959.

Primary Examiner—Stephen C. Bentley
Attorney—Cushman, Darby & Cushman and Rufus M. Franklin

[57] ABSTRACT

The protective capability of composite armor panels is increased by removing material from the outermost layer or layers of the ceramic face plate thereof, of a thickness of from about 0.003 to about 0.050 inch, and then adhering said plate to a backing element.

2 Claims, 1 Drawing Figure

PATENTED NOV 14 1972 3,702,593
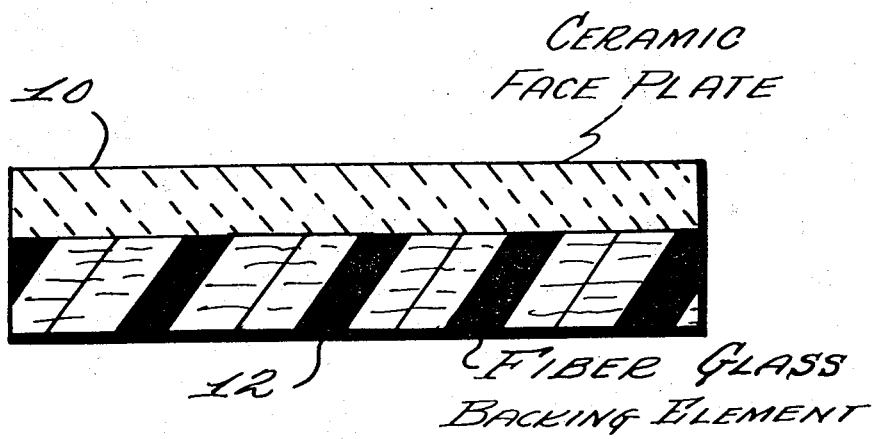
INVENTOR
RICHARD A. FINE
BY Cushman, Darby & Cushman
ATTORNEYS

REMOVAL OF SURFACE FROM BORON CARBIDE COMPOSITE ARMOR

BACKGROUND OF THE INVENTION

New composite armor systems for protection against high energy projectiles such as small arms fire, 0.30 caliber AP bullets, for example, have recently been developed. One successful type of such armor consists of a hard, high density ceramic plate backed by a bonded laminate of glass cloth adhered thereto. When such armor is struck on its ceramic face by a projectile of sufficiently high energy, the ceramic plate shatters and fails, as does the projectile, and the energy of the projectile is delivered to the glass cloth backing element and dissipated in delamination of the bonded layers of the glass cloth. When this occurs, persons or objects protected behind the armor suffer no injury from the impact. Ceramic materials useful in the invention include high temperature fabricated polycrystalline alumina, silicon carbide and boron carbide.

A useful measure of the protective capability of an armor plate or armor panel is known as its $V_{50}$ value. This value is defined as the velocity at which fifty per cent of projectiles fired at the armor panel will penetrate it.

I have discovered that the $V_{50}$ value can be raised several hundred feet per second, in the case of ceramic composite armor panels, merely be grinding one or both surfaces of the ceramic plates, removing material from the outermost layer or layers thereof of a thickness of from about 0.003 to about 0.020 inch, and up to 0.050 inch, before the plate is adhered to a backing element.

DESCRIPTION OF THE PREFERRED EMBODIMENT

A standard hot-pressed monolithic polycrystalline boron carbide plate, 0.310 inch thick, is ground on one side to remove approximately 0.010 inch from the surface, and then mounted by adhering to a backing element of standard construction. The armor thus produced exhibited a $V_{50}$ rating of 300 feet per second greater than the armor of the same construction produced from the tile of the same thickness, unground, thus having the identical areal density.

The outer layer material of the ceramic face plate may be removed by grinding, as indicated, or may be removed as well chemically, thermally or by EDM (electro discharge machining.)

Grinding may be with an arbor grinder, using diamond discs positioned face down. The grinding removes the outer surface material and goes quite readily until the harder underlying material is reached. Desirably, removal of the surface layer material also improves the flatness and surface finish of the tile.

The ground ceramic tile is then adhered to a suitable backing element, such as a 12-ply glass cloth laminate bonded with a standard commercial catalyzed polyester resin system.

THE DRAWING

In the drawing, FIG. 1 is a sectional view of an exemplary composite armor panel, including a ceramic face plate 10 adhered to the fiber glass backing element 12.

The ceramic face plate, as previously indicated, is approximately 0.30 inch thick, and the laminated glass fiber backing element is approximately 0.25 inch thick.

The backing element 12 is bonded to the ceramic face plate 10 by means of any suitable commercial resin adhesive, such as an epoxy resin adhesive. The panel, using a ground face plate, weighs approximately 6.7 pounds per square foot.

It has been found that the greatest improvement in ballistic performance may be obtained by removing outer layer material from both surfaces of the ceramic plate before assembly with the backing element. This expedient achieves all the benefits previously suggested, and it is thought that the treated surfaces may exert some synergistic effect on each other. While the precise mechanism of this is not known, it has been suggested that a treated (and accordingly flatter and more highly finished) interface surface is thought to have higher tensile strength than might otherwise be the case. High tensile strength at the back surface of the face plate may improve the performance of the armor panel by delaying failure from the reflected shock wave following impact against the face surface.

The material removal step is beneficial also when only on surface is ground, and the untouched surface is adhered to the backing element, leaving the treated surface exposed to ballistic impact. Conceivably, this may be because of the resultant greater uniformity of load application by a projectile when it impacts. Also, the untouched exposed surface may exhibit some sort of cushioning effect to impacting projectiles. It is thought possible that the softer surface may fracture impacting projectiles less completely.

This invention is generally applicable to ceramic oxide and carbide armor plates formed by conventional hot-pressing techniques. In such processing the surface of the plate, to a depth of up to 0.050 inch (depending upon the geometry of the plate and parameters of the forming process) is of different structure or chemistry from the body of the plate. This invention resides in the discovery that removal of that surface layer improves the ballistic properties of the plate when formed into a composite armor structure. Such plates may be of mixed composition and include $Al_2O_3$, $B_4C$, $SiC$, $TiB_2$ and $AlB_{12}$. Exemplary compositions include boron carbide with additions of other carbides up to 50 percent by weight. The invention is applicable to materials formed by other fabrication techniques which produce an outer layer of different structure, similar to the effect produced in hot-pressing.

I claim:

1. Composite armor panel comprising a ceramic face plate which comprises boron carbide 50 percent by weight or more and a backing element adhered thereto, the outer surface of said face plate having been modified to improve its ballistic properties by removing material from the outer surface layer thereof, said material ranging from about 0.003 inch to about 0.050 inch in thickness.

2. Composite armor panel comprising a ceramic face plate in the form of a hot pressed monolithic shape consisting essentially of polycrystalline boron carbide and a backing element adhered thereto, both surfaces of said face plate having been modified to improve the ballistic properties of said panel by removing material from the outer surface layer, said material ranging from about 0.003 inch to about 0.050 inch in thickness.

* * * * *